United States Patent [19]

Andreikov et al.

[11] 3,927,040
[45] Dec. 16, 1975

[54] METHOD OF SIMULTANEOUS PRODUCTION OF PHTHALIC ANHYDRIDE AND ANTHRAQUINONE

[76] Inventors: Evgeny Iosifovich Andreikov, ultisa Belinskogo, 152, korpus 2, kv. 83; Alexandr Stepanovich Kostromin, ulitsa Kraulya, 61, korpus 1, kv. 152; Natalya Dmitrievna Rusyanova, ulitsa 8 Marta 7, kv. 3, all of Sverdlovsk, U.S.S.R.

[22] Filed: Aug. 9, 1973

[21] Appl. No.: 387,035

[30] Foreign Application Priority Data
Jan. 1, 1971   U.S.S.R. .............................. 1604520

[52] U.S. Cl. ............................. 260/346.4; 260/385
[51] Int. Cl.² ................. C07D 307/89; C07C 49/68
[58] Field of Search ......................... 260/346.4, 385

[56] References Cited
UNITED STATES PATENTS 1,285,117   11/1918   Gibbs et al. ...................... 260/346.4
2,769,018   10/1956   West ................................ 260/385

OTHER PUBLICATIONS

Gharda, Chemical Processing and Engineering, Vol. 2, July 1968, p. 101–104.

*Primary Examiner*—Henry R. Jiles
*Assistant Examiner*—Bernard I. Dentz
*Attorney, Agent, or Firm*—Holman & Stern

[57] ABSTRACT

A method of simultaneous production of phthalic anhydride and anthraquinone, consisting in a vapour-phase oxidation of a stock material which is a mixture of naphthalene and anthracene by atmospheric oxygen in a stationary bed of a vanadium catalyst. The oxidation is carried out at a space rate of feed of said mixture equal to 50–120 g/hour per litre of the catalyst and at a stock-to-air ratio of 0.03–0.08 g/litre.

6 Claims, No Drawings

METHOD OF SIMULTANEOUS PRODUCTION OF PHTHALIC ANHYDRIDE AND ANTHRAQUINONE

This invention relates to processes for the producing anthraquinone and phthalic anhydride, and more particularly it relates to a method of simultaneous production of phthalic anhydride and anthraquinone.

Anthraquinone and phthalic anhydride are widely used in organic synthesis for producing various chemical products; for example, anthraquinone is used for the manufacture of dyes, and phthalic anhydirde is used in the manufacture of polymers, as plasticizing agents, and other products of organic synthesis.

A method of producing phthalic anhydride by vapour-phase catalytic oxidation of naphthalene by atmospheric oxygen over vanadium catalysts is known in the prior art.

Anthraquinone is produced in industry both synthetically and by vapour-phase catalytic oxidation of pure anthracene.

These methods suffer from serious disadvantages.

The vapour-phase oxidation of naphthalene over vanadium catalysts is characterized by a comparatively low yield, viz., 95–97 per cent by weight.

The industrial method of producing anthraquinone by vapour-phase catalytic oxidation of anthracene is effected over catalysts having a low capacity (20–25 litre g/liter per hour), and the yield of the product is as low as 80–84 per cent by weight.

Aside from the abovementioned methods, another method is known in the prior art for the simultaneous production of anthraquinone and phthalic anhydride by a vapour-phase oxidation of an anthracene-phenanthrene fraction of coal-tar processing. The advantage of this method is the cheapness of the starting material, with the fraction being obtained by rectifying crude anthracene isolated from coal tar, and also the utilization of a simple catalyst which is used in industry for preparing phthalic anhydride from naphthalene. However, the capacity of the catalyst under these conditions is low and the conversion of the starting raw materials in the process is unsufficiently high (the yield of the main products is 71–75 per cent by weight, as calculated with reference to the raw materials passed.

The object of this invention is to provide a method which would ensure the simultaneous production of the two products, namely, anthraquinone and phthalic anhydride, with higher yields.

Another object of the invention is to increase the capacity of the catalyst in the process of simultaneous production of anthraquinone and phthalic anhydride.

Still another object of the invention is to increase the degree of the starting material conversion to the main products.

These objects have been attained in a method for the simultaneous production of phthalic anhydride and anthraquinone, which according to the invention, consists in the vapour-phase oxidation of a mixture of anthracene and naphthalene by atmospheric oxygen in the stationary bed of a vanadium catalyst. The anthracene-naphthalene ratio in the mixture may vary, being depending upon which particular product is desired in the process that moiety is given prevalence.

If it is desirable to produce phthalic anhydride in said ratio in a greater proportion, and anthraquinone in a lesser proportion, the naphthalene-anthracene ratio in the mixture should be from 1:1 to 6:1.

In this case the concentration of phthalic anhydride in the reaction mixture will be from 60 to 85–90 per cent.

On the contrary, if anthraquinone is the main desired product, while phthalic anhydride is wanted in lesser quantities, the ratio of the starting naphthalene to anthracene should be from 1:2 to 1:3. The concentration of the anthraquinone in the reaction mixture will in this case be from 55 to 70 per cent.

The temperature in the zone of the vapour-phase catalytic oxidation should preferably be maintained from 340° to 400°C.

At a lower temperature the reaction rate is decelerated, while higher temperatures could inactivate the catalyst and impair the selectivity of the process.

The starting materials should preferably be fed into the said zone of the vapour-phase catalytic oxidation at a space rate of 50–120 g/liter per hour. The variation in the space rate of feed of the stock materials also affects the ratio of the main products in the reaction mixture. At space rates of feed of less than 50 g/hour per liter for the catalyst, part of phthalic anhydride burns out, and at a rate of over 120 g/hour per liter for the catalyst, unreacted naphthalene appears in the reaction products.

The concentration of the stock materials in the vapour-air mixture should preferably be maintained in the limits of 0.03–0.08 g/liter of air. At higher concentrations the catalyst can be inactivated and at lower concentrations the process becomes economically inefficient.

The process is effected over a catalyst which is a compound of vanadium and sulphates of alkali metals on a carrier. Use can be made of a vanadium-potassium-sulphate-silica-gel catalyst and its various modifications, for example, catalysts possessing a higher developed surface or multiporous structure.

The study of the oxidation kinetics of the aromatic compounds and their mixtures over vanadium catalysts carried out by the inventors reveals the chemical mechanisms of the oxidation processes of both naphthalene and anthracene separately, and of their mixtures.

The inventors have established that the reactions of vapour-phase catalytic oxidation of anthracene and naphthalene proceed at different rates, the rate of the oxidation of anthracene over the vanadium catalyst being markedly higher than that of naphthalene. The reactions of the oxidation of anthracene and naphthalene proceed in different diffusion regions of the catalyst: anthracene reacts in the superficial layer of the catalyst granule, while naphthalene in the entire volume thereof.

The oxidation reaction of naphthalene proceeds so that alongside the phthalic anhydride, formed also as a side product of 1,4-naphthoquinone is also formed. It is formed mainly in the beginning of the catalyst bed. The reaction of the formation of 1,4-naphthoquinone is unwanted, since as the reaction mixture passes further through the catalyst bed, a greater part of the 1,4-naphthoquinone burns without the conversion to phthalic anhydride. As a result, the yield of the end product decreases.

If anthracene is present in the reaction mixture, the process of naphthalene oxidation changes. Due to a greater rate of oxidation for anthracene, its presence slows down the rate of oxidation of naphthalene in the beginning of the catalyst bed and inhibits the unwanted reaction of 1,4-naphthoquinone formation.

The presence of anthracene in the subsequent layers of the catalyst does not slow down the process of naphthalene oxidation. The anthraquinone that is formed in the process of anthracene oxidation is no longer oxidized to phthalic anhydride since the unreacted naphthalene, the oxidation rate of which to from phthalic anhydride exceeds that of the oxidation of anthraquinone, and inhibits the oxidation process. As the contact time increases (as the space rate of feed decreases) after the complete reaction of naphthalene, part of the anthraquinone can be converted to phthalic anhydride. Thus, by varying the space rate of feed of the starting materials (that is, by varying the time of contact) the desired ratio of the main products in the reaction mixture can be attained.

The afore-described mechanism for the process explains the advantages of the oxidation of a mixture of naphthalene and anthracene as compared with the oxidation of individual hydrocarbons and an anthracene-phenanthrene mixture.

The main advantage of the invention resides in an increased capacity of the catalyst, which (as has already been said) is due to the oxidation of anthracene and naphthalene in different diffusion regions of the catalyst.

In order to ensure the selectivity of the process of anthracene oxidation to anthraquinone, catalysts possessing low catalytic capacity are usually used, since at higher catalyst capacities the phthalic anhydride is produced in increased quantities, which is undesirable in this case, as it reduces the yield of the main reaction product, viz., anthraquinone.

These phenomena are useful in realizing our invention. The presence of naphthalene in the reaction mixture ensures the utilization of not only the superficial layer of the catalyst granules, but of its the entire volume thereof, owing to which the capacity of the catalyst increases. Moreover catalysts of a higher capacity can be used also. Phthalic anhydride, which is formed from anthracene alongside the anthraquinone, is not an admixture but the main reaction product.

Given below are comparative characteristics of the known methods of producing phthalic anhydride and anthraquinone and of the herein-proposed method (See Table 1).

Thus, the oxidation of a mixture of naphthalene and anthracene under approximately the same conditions as those under which naphthalene is oxidized, increases the capacity of the contact apparatus two times, with the yield of phthalic anhydride (calculated with reference to naphthalene) being increased Table 1

| Starting material | Temperature, °C | Catalyst capacity g/liter per hour | Stock concentrations g/liter | Yield of phthalic anhydride (with rererence to naphthalene), % (w/w) | Yield of anthraquinone (with reference to anthracene), % (w/w) | Total yield of reaction products, %(w/w) |
|---|---|---|---|---|---|---|
| Naphthalene | 350–370 | 36–40 | 0.04–0.045 | 95–97 | — | 95–97 |
| Anthracene | 370–390 | 20–25 | 0.022 | — | 80–84 | 80–84 |
| Mixture of naphthalene and anthracene (1:1) | 340–400 | 80–90 | 0.045 | 120 | 80 | 100 | also, and the other product of the reaction, anthraquinone, is produced by the same process at a high yield.

Table 2 which follows below gives the comparative data on the oxidation of anthracene-phenanthrene fraction and a mixture of naphthalene with anthracene (1:1).

Table 2

| Starting material | Yield of phthalic anhydride (with reference to raw stock),%, %(w/w) | Yield of anthraquinone (with reference to raw stock), %(w/w) | Capacity of catalyst (with reference to phthalic anhydride), g/liter per hour | Capacity of catalyst with reference to anthraquinone), g/liter per hr |
|---|---|---|---|---|
| Anthracene-phenanthrene fraction | 37 | 31 | 16 | 13 |
| Mixture of naphthalene with anthracene (1:1) | 60 | 40 | 55 | 37 |

The above data show that the oxidation of the naphthalene-anthracene mixture (as compared with the oxidation of the anthracene-phenanthrene fraction) increases the capacity of the catalyst, and also markedly increases the total yield of the reaction products.

The present invention can be realized on the equipment employed for producing phthalic anhydride, in which great quantities of phthalic anhydride and anthraquinone can be produced simultaneously in one reaction vessel with a stationary catalyst bed.

Anthracene (isolated from coal tar) and naphthalene (used in the catalytic oxidation to phthalic anhydride) should be recommended for utilization as the stock.

For a better understanding of the invention, the following examples of its practical embodiment are given by way of illustration.

EXAMPLE 1

A mixture of naphthalene and anthracene, taken in a ratio of 1:1, is oxidized by air in a stationary bed of a vanadium-potassium sulphate-silica gel catalyst. The quantity of the catalyst is 650 ml, the reaction temperature is 380°C, the concentration of hydrocarbons in the vapour-air mixture is 0.046 g/liter, and the space rate of feed of the stock materials is 92 g/liter per hour. 100 per cent of the naphthalene-anthracene mixture is converted to the reaction products.

The yield of the process is 80 per cent by weight of anthraquinone and 97 per cent of phthalic anhydride, as calculated with reference to the passed anthracene and naphthalene, respectively. The production capacity of the catalyst with reference to anthraquinone is 37 g/liter per hour and 45 g/liter per hour with reference to phthalic anhydride.

EXAMPLE 2

In contrast to Example 1, the oxidation was carried out at a space rate of feed of the stock of 55 g/liter per hour. The conversion of the mixture of naphthalene and anthracene was 100 per cent. The reaction products were 70 per cent by weight for anthraquinone and 118 per cent by weight for phthalic anhydride, as calculated with respect to the anthracene and naphthalene passed, respectively.

EXAMPLE 3

The mixture similar to that described in Example 1 was oxidized on the catalyst having an increased specific surface. The space rate of feed of the stock was 90 g/liter per hour, the concentration was 0.045 g/liter, the process temperature was 350°C. The conversion of naphthalene and anthracene was 100 per cent.

The reaction products were 80 per cent by weight for anthraquinone, and 118 per cent by weight for phthalic anhydride, as calculated with respect to the anthracene and naphthalene passed, respectively.

EXAMPLE 4

The weight ratio of the stock components, the space rate of feed of the stock, and the volume of the catalyst were similar to those in Example 3. The reaction temperature was 370°C. The catalyst used in this experiment had a multiporous structure. The conversion of naphthalene and anthracene was 100 per cent. The reaction products were 80 per cent by weight for anthraquinone and 120 per cent by weight for phthalic anhydride, as calculated with respect to the anthracene and naphthalene passed, respectively.

EXAMPLE 5

Under conditions similar to those described in Example 4, a mixture of naphthalene and anthracene taken in a ratio of 1.5:1 was oxidized. The conversion of naphthalene and anthracene was 100 per cent. The anthraquinone yield was 86 per cent by weight, and for phthalic anhydride, 112 per cent by weight, as calculated with respect to the anthracene and naphthalene passed, respectively. The ratio of phthalic anhydride to anthraquinone was 1.96 : 1.

EXAMPLE 6

Under conditions similar to those as described in Example 5, a mixture of naphthalene with anthracene taken in a ratio of 1:1.22 was oxidized. The conversion of naphthalene with anthracene was 100 per cent. The reaction products were 70 per cent by weight for anthraquinone and 128 per cent by weight for phthalic anhydride, as calculated with respect to the naphthalene and anthracene passed, respectively. The ratio of phthalic anhydride to anthraquinone was 1.5:1.

What is claimed is:

1. A method of simultaneously producing phthalic anhydride and anthraquinone comprising oxidizing a mixture of anthracene and naphthalene in the vapor phase with a molecular oxygen-containing gas in a stationary vanadium catalyst bed at a temperature of from 340° to 400°C.

2. A method according to claim 1, in which, in order to produce predominantly phthalic anhydride, a mixture of naphthalene with anthracene is oxidized in which the components are taken in a ratio from 1:1 to 6:1.

3. A method according to claim 1, in which, in order to produce predominantly anthraquinone, a mixture of naphthalene with anthracene is oxidized in which the components are taken in a ratio from 1:2 to 1:3.

4. A method according to claim 1, in which the stock material is fed into the zone of catalytic oxidation at a space rate of from 50 to 120 g/hour per liter of the catalyst.

5. A method according to claim 1, in which the concentration of the stock fed together with air into the zone of catalytic oxidation is from 0.03 to 0.08 g per liter of air.

6. A method according to claim 1, in which compounds of vanadium and sulphates of alkali metals supported on a carrier are used as the catalysts.

* * * * *